(12) United States Patent
Novlan et al.

(10) Patent No.: US 10,952,083 B2
(45) Date of Patent: Mar. 16, 2021

(54) NETWORK OPTIMIZATION AND CONTROL FOR WIRELESS NETWORKS

(71) Applicant: AT&T Intellectual Property I, L.P., Atlanta, GA (US)

(72) Inventors: Thomas Novlan, Cedar Park, TX (US); Arunabha Ghosh, Austin, TX (US); Milap Majmundar, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/282,800

(22) Filed: Feb. 22, 2019

(65) Prior Publication Data

US 2020/0154287 A1    May 14, 2020

Related U.S. Application Data

(60) Provisional application No. 62/760,029, filed on Nov. 12, 2018.

(51) Int. Cl.
| | |
|---|---|
| *H04W 24/02* | (2009.01) |
| *H04W 76/27* | (2018.01) |
| *H04W 36/00* | (2009.01) |
| *H04W 28/16* | (2009.01) |
| *H04L 5/00* | (2006.01) |

(52) U.S. Cl.
CPC ......... *H04W 24/02* (2013.01); *H04L 5/0075* (2013.01); *H04W 28/16* (2013.01); *H04W 36/0058* (2018.08); *H04W 36/0069* (2018.08); *H04W 36/0088* (2013.01); *H04W 76/27* (2018.02)

(58) Field of Classification Search
CPC ...... H04W 24/02; H04W 28/16; H04L 5/0075
See application file for complete search history.

(56) References Cited

U.S. PATENT DOCUMENTS 9,756,678 B2  9/2017  Yamada
9,844,047 B2  12/2017  Fukuta et al.
(Continued)

OTHER PUBLICATIONS

International Search Report and Written Opinion received for PCT Application Serial No. PCT/US2019/058985 dated Feb. 5, 2020, 19 pages.

(Continued)

*Primary Examiner* — Gary Mui
(74) *Attorney, Agent, or Firm* — Amin, Turocy & Watson, LLP

(57) ABSTRACT

The disclosed technology is generally directed towards optimization and control of wireless networks based on monitoring and/or analytics data received at a radio access network (RAN) controller device in a split RAN protocol architecture. The RAN controller device processes the monitoring/analytics data and provides control information and/or optimization data, which can be policy data, to a central unit device that can configure the wireless network based on the control information and/or optimization data. The technology can facilitate optimization and configuration of mobility procedures including handovers and secondary cell group changes, optimization of carrier aggregation and dual connectivity procedures based on multiple metrics, and can facilitate centralized optimization of topology and route selection for integrated access and backhaul nodes.

20 Claims, 10 Drawing Sheets

(56) References Cited

U.S. PATENT DOCUMENTS

| | | |
|---|---|---|
| 10,009,260 B2 | 6/2018 | Hampel et al. |
| 10,015,805 B2 | 7/2018 | Zhang et al. |
| 10,015,837 B2 | 7/2018 | Rahman et al. |
| 10,028,328 B2 | 7/2018 | Kwon |
| 10,064,051 B2 | 8/2018 | Ingale et al. |
| 10,104,585 B2 | 10/2018 | Park et al. |
| 2014/0066074 A1* | 3/2014 | Folke ............... H04W 36/08 455/437 |
| 2015/0358836 A1 | 12/2015 | Zhu et al. |
| 2017/0006499 A1* | 1/2017 | Hampel ............ H04W 28/10 |
| 2017/0156049 A1 | 6/2017 | Bergstrom et al. |
| 2017/0180090 A1* | 6/2017 | Park ................. H04W 24/10 |
| 2017/0202005 A1* | 7/2017 | Madan ........... H04W 72/1231 |
| 2017/0222876 A1 | 8/2017 | Van Der Velde et al. |
| 2017/0332303 A1* | 11/2017 | Sunay ................ H04W 8/22 |
| 2018/0092139 A1 | 3/2018 | Novlan et al. |
| 2018/0176825 A1* | 6/2018 | Ercan ............... H04W 28/08 |
| 2018/0199328 A1 | 7/2018 | Sang et al. |
| 2018/0213450 A1 | 7/2018 | Futaki et al. |
| 2018/0262924 A1* | 9/2018 | Dao ............... H04W 72/1257 |
| 2018/0324780 A1 | 11/2018 | Novlan et al. |
| 2018/0376422 A1* | 12/2018 | Shu ................. H04W 76/27 |
| 2019/0069333 A1* | 2/2019 | Kim ................. H04W 76/12 |
| 2019/0246420 A1* | 8/2019 | Park ............... H04W 72/0433 |
| 2019/0280845 A1* | 9/2019 | Bedekar ......... H04W 72/0433 |
| 2019/0373627 A1* | 12/2019 | Luo ............... H04W 72/1242 |
| 2020/0022065 A1* | 1/2020 | Yan .................. H04W 4/42 |

OTHER PUBLICATIONS

"3rd Generation Partnership Project; Technical Specification Group Services and System Aspects; Telecommunication management; Study on management aspects of next generation network architecture and features", Jan. 4, 2018, 38 pages.

Ericsson, "OAM for the CU-DU deployment", 3GPP Draft; R3-171730, URL:http://www.3gpp.org/ftp/Meetings_3GPP_SYNC/RAN3/Docs/, May 15-19, 2017, 3 pages.

ZTE, "Discussion on OAM in CU-DU deployment", 3GPP Draft; R3-172926 URL:http://www.3gpp.org/ftp/Meetings_3GPP_SYNC/RAN3/Docs/, Aug. 21-25, 2017, 5 pages.

NTT DOCOMO Inc., "CU-DU interface: M-plane aspects", 3GPP Draft; R3-171002, http://www.3gpp.org/ftp/Meetings 3GPP_SYNC/RAN3/Docs/, Apr. 3, 2017, 4 pages.

* cited by examiner

NETWORK OPTIMIZATION AND CONTROL FOR WIRELESS NETWORKS

CROSS-REFERENCE TO RELATED APPLICATIONS

This application is a non-provisional of U.S. Provisional Patent Application No. 62/760,029, filed on Nov. 12, 2018 entitled "NETWORK OPTIMIZATION AND CONTROL FOR 5G NETWORKS." The entirety of the aforementioned application is hereby incorporated herein by reference.

TECHNICAL FIELD

The present application relates generally to the field of mobile communications, and more particularly to enabling mobility, dual connectivity, and backhaul routing optimization using a radio access network controller in an advanced wireless network.

BACKGROUND

To meet the huge demand for data centric applications, Third Generation Partnership Project (3GPP) systems and systems that employ one or more aspects of the specifications of the Fourth Generation (4G) standard for wireless communications will be extended to a Fifth Generation (5G) standard for wireless communications. Challenges exist with respect to providing levels of service associated with forthcoming 5G and other next generation network standards.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
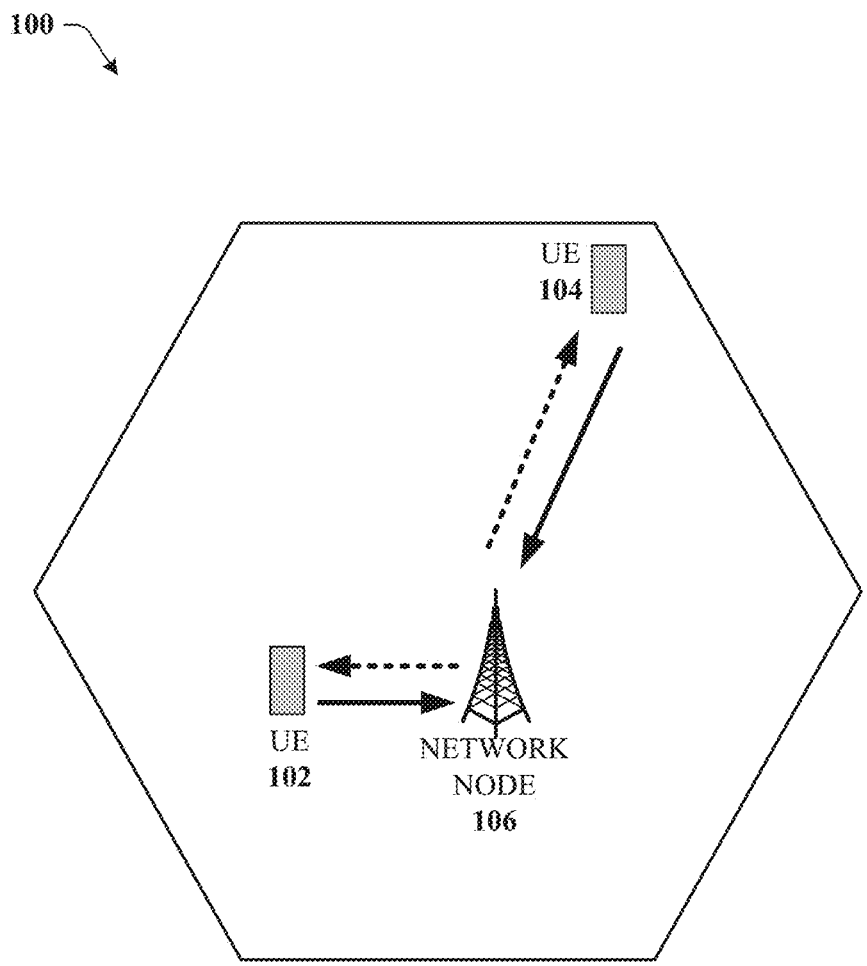
FIG. 1 illustrates an example wireless communication system, in accordance with various aspects and embodiments of the subject disclosure.

Various embodiments of the technology disclosed herein are directed towards facilitating mobility, dual-connectivity, and backhaul routing optimization using a Radio Access Network (RAN) controller that can interface with the network and use radio measurements and other metrics and analytics to optimize RAN performance. Note that as used herein, the terms "optimize," "optimization" and "optimizing" do not necessarily mean actually ideal, but rather can be interpreted as moving towards a more optimal state.

As will be understood, the technology the RAN Controller can be used to optimize RAN operation in different scenarios, including to directly or indirectly influence or control the operation of the Central Unit (CU) and underlying protocol layers, including procedures involving radio resource control (RRC) signaling. Example, non-limiting scenarios include mobility/radio resource management (RRM); carrier aggregation/dual connectivity (CA/DC) addition/removal; and integrated access and backhaul (IAB) topology formation and routing updates.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable (or machine-readable) device or computer-readable (or machine-readable) storage/communications media. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

Moreover, terms such as "mobile device equipment," "mobile station," "mobile," subscriber station," "access terminal," "terminal," "handset," "communication device," "mobile device" (and/or terms representing similar terminology) can refer to a wireless device utilized by a subscriber or mobile device of a wireless communication service to receive or convey data, control, voice, video, sound, gaming or substantially any data-stream or signaling-stream. The foregoing terms are utilized interchangeably herein and with reference to the related drawings. Likewise, the terms "access point (AP)," "Base Station (BS)," BS transceiver, BS device, cell site, cell site device, "gNode B (gNB)," "evolved Node B (eNode B)," "home Node B (HNB)" and the like, are utilized interchangeably in the application, and refer to a wireless network component or appliance that transmits and/or receives data, control, voice, video, sound, gaming or substantially any data-stream or signaling-stream from one or more subscriber stations. Data and signaling streams can be packetized or frame-based flows.

Furthermore, the terms "device," "communication device," "mobile device," "subscriber," "customer entity," "consumer," "customer entity," "entity" and the like are employed interchangeably throughout, unless context warrants particular distinctions among the terms. It should be appreciated that such terms can refer to human entities or automated components supported through artificial intelligence (e.g., a capacity to make inference based on complex mathematical formalisms), which can provide simulated vision, sound recognition and so forth.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

FIG. 1 illustrates an example wireless communication system 100 in accordance with various aspects and embodiments of the subject disclosure. In one or more embodiments, system 100 can comprise one or more user equipment UEs 104 and 102, which can have one or more antenna panels having vertical and horizontal elements. A UE 102 can be a mobile device such as a cellular phone, a smartphone, a tablet computer, a wearable device, a virtual reality (VR) device, a heads-up display (HUD) device, a smart car, a machine-type communication (MTC) device, and the like. UE 102 can also refer to any type of wireless device that communicates with a radio network node in a cellular or mobile communication system. Examples of UE 102 are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. User equipment UE 102 can also comprise IOT devices that communicate wirelessly. In various embodiments, system 100 is or comprises a wireless communication network serviced by one or more wireless communication network providers. In example embodiments, a UE 102 can be communicatively coupled to the wireless communication network via a network node 106.

The non-limiting term network node (or radio network node) is used herein to refer to any type of network node serving a UE 102 and UE 104 and/or connected to other network node, network element, or another network node from which the UE 102 or 104 can receive a radio signal. Network nodes can also have multiple antennas for performing various transmission operations (e.g., MIMO operations). A network node can have a cabinet and other protected enclosures, an antenna mast, and actual antennas. Network nodes can serve several cells, also called sectors, depending on the configuration and type of antenna. Examples of network nodes (e.g., network node 106) can comprise but are not limited to: NodeB devices, base station (BS) devices, access point (AP) devices, and radio access network (RAN) devices. The network node 106 can also comprise multi-standard radio (MSR) radio node devices, including but not limited to: an MSR BS, an eNode B, a network controller, a radio network controller (RNC), a base station controller (BSC), a relay, a donor node controlling relay, a base transceiver station (BTS), a transmission point, a transmission node, an RRU, an RRH, nodes in distributed antenna system (DAS), and the like. In 5G terminology, the node 106 can be referred to as a gNodeB device.

Wireless communication system 100 can employ various cellular technologies and modulation schemes to facilitate wireless radio communications between devices (e.g., the UE 102 and 104 and the network node 106). For example, system 100 can operate in accordance with a UMTS, long term evolution (LTE), high speed packet access (HSPA), code division multiple access (CDMA), time division multiple access (TDMA), frequency division multiple access (FDMA), multi-carrier code division multiple access (MC-CDMA), single-carrier code division multiple access (SC-CDMA), single-carrier FDMA (SC-FDMA), OFDM, (DFT)-spread OFDM or SC-FDMA)), FBMC, ZT DFT-s-

OFDM, GFDM, UFMC, UW DFT-Spread-OFDM, UW-OFDM, CP-OFDM, resource-block-filtered OFDM, and UFMC. However, various features and functionalities of system 100 are particularly described wherein the devices (e.g., the UEs 102 and 104 and the network device 106) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs).

Figure 2:
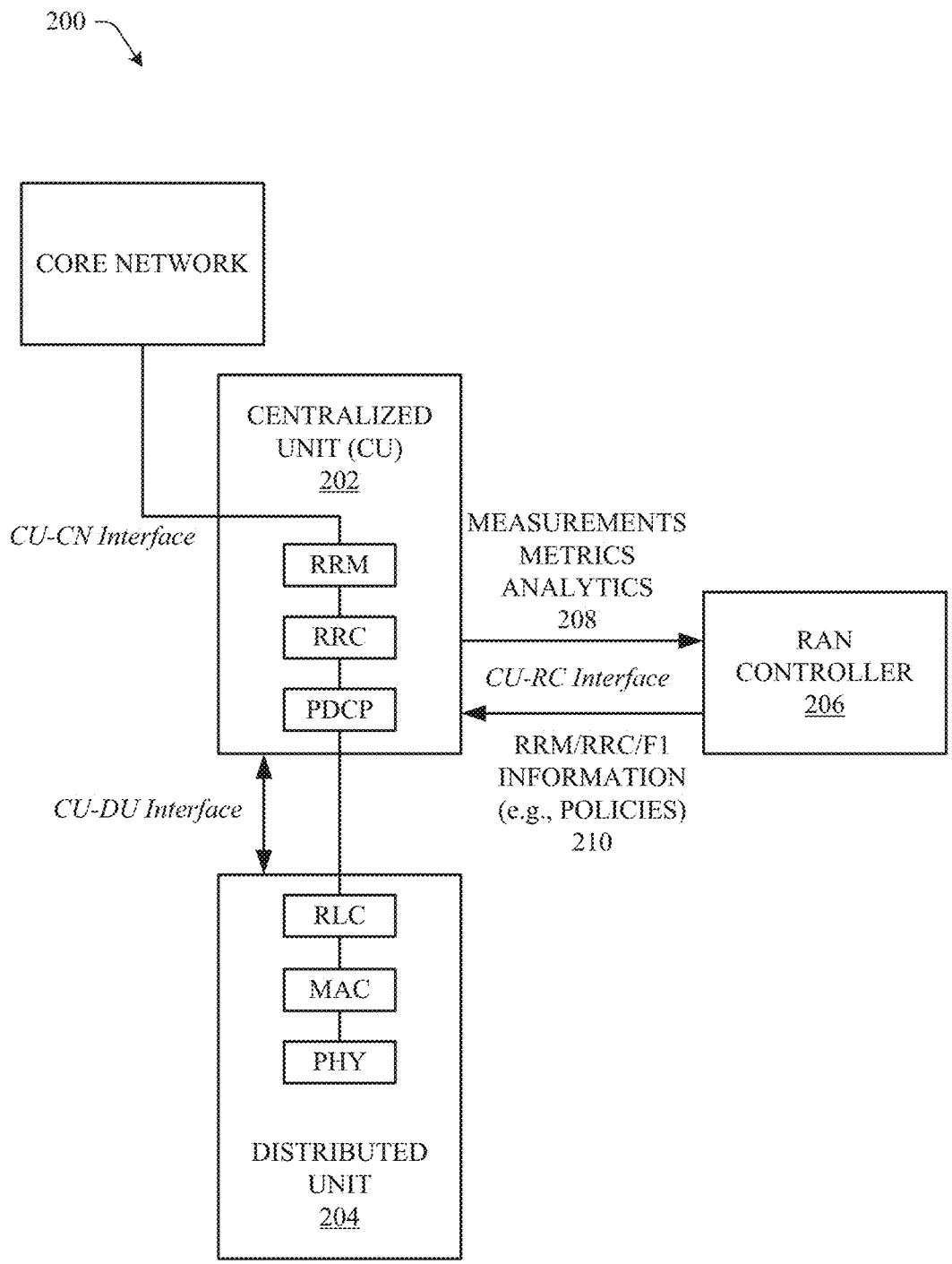
FIG. 2 illustrates an example block diagram of a split architecture network with a radio access network controller, in accordance with various aspects and embodiments of the subject disclosure.

Turning now to FIG. 2, illustrated is an example block diagram of a split architecture network with a radio access network controller in accordance with various aspects and embodiments of the subject disclosure. More particularly, 5G networks or New Radio (NR) can be deployed as a standalone (SA) radio access technology or as a non-standalone (NSA) radio access technology assisted by another radio access technology. 4G or Long Term Evolution (LTE), which is currently deployed, can provide seamless coverage and uninterrupted connectivity, however NR can provide increased data rates or new services but due to the currently limited distribution, dual connectivity between LTE and NR is especially attractive for NSA NR because control plane functions can be sent over LTE while the data plane transmissions can be mapped to NR, allowing for simplified early NR deployments where device support for both LTE and NR is expected. Future deployments can migrate to a standalone NR operation as well, where control plane information is also sent over NR. In an embodiment, the master cell group (MCG) bearer provides control plane functionality is sent over LTE, while user plane traffic may be sent over both LTE and NR:

3GPP NR-based 5G mobile networks can be deployed using a split RAN protocol architecture such that on the user plane, the packet data convergence protocol (PDCP) sublayers can reside at a centralized unit (central unit/CU) device 202, while the RLC (radio link control), MAC (media access control), and PHY (physical) layers can reside at the distributed unit (DU) device 204. The CU-UP (centralized unit-user plane) manages user plane data which is carried on Data Radio Bearers (DRBs) that traverse the above described user plane RAN protocol architecture. On the control plane, the CU-CP (centralized unit-control plane) utilizes signaling radio bearers (SRBs) that are set up and carry control messages from the RRC layer and which also utilize the packet data convergence protocol (PDCP) layer at the centralized unit 202, and are further carried down through the RLC, MAC, and PHY layers at the distributed unit 204 to be delivered to the UE over the air interface. Each network user can be allocated multiple DRBs and SRBs by the network. The network interface between the centralized unit 202 and distributed unit 204 can be called the F1 interface per 3GPP specifications.

As described herein, the centralized unit 202 is connected to a RAN controller (RC) 206 device such as shown in FIG. 2. The RAN controller 206 can be provided with measurements, metrics, and other analytics 208 (e.g., counters, statistics, messages) from the centralized unit 202, which can be then processed by the RAN controller 206 using optimization, machine learning, and other tools to determine policies and procedures related to RRM, RRC which can be used to manage mobility, dual-connectivity, carrier aggregation, and IAB topology formation and routing. The measurements and other information from the centralized unit 202 may be provided directly without processing at the centralized unit 202, or may be aggregated, refined, and filtered at the centralized unit 202, e.g., to reduce the signaling volume and simplify the processing at the RAN controller 206.

The RAN controller 206 can be physically separated or co-located with other RAN equipment, including the centralized unit 202 (CU-UP and/or CU-CP). The RAN controller 206 also may be a logical entity that is virtualized to run on different hardware platforms in a flexible manner. The interface between the centralized unit 202 and RAN controller 206 can be implemented according to a standardized open interface (e.g., E2 interface) or over a proprietary interface with vendor/operator specific application protocol interfaces (APIs) defined to exchange the information between the centralized unit 202 and RAN controller 206 according to the scenarios and algorithms supported.

In one example, the RAN controller 206 provides explicit RRC/F1 information 210 elements to the centralized unit 202. Note that it is feasible to directly pass the corresponding RRC/F1 messages 210 between the centralized unit 202 to the RAN controller 206, however the volume and frequency of those messages may include significant processing at the RAN controller 206 and thus could place stringent requirements on the throughput and latency of the CU-RC interface. Thus, in another example the RAN controller 206 does not provide the explicit RRC/F1 messages 210, but instead provides the information as policies governing the configuration and operation of procedures at the centralized unit 202, which implicitly indicates values or ranges of values for the RRC/F1 configurations from which the centralized unit 202 may select the values to provide to UEs or connected DUs (e.g., distributed unit 204).

Figure 3:
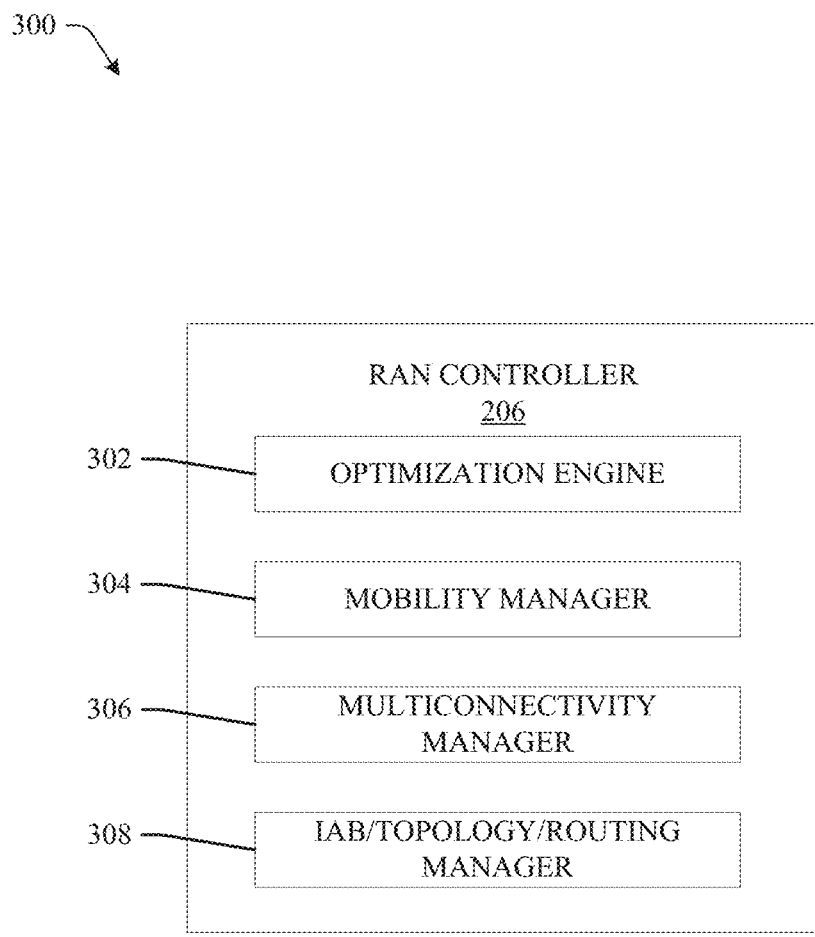
FIG. 3 illustrates an example block diagram of a radio access network controller, in accordance with various aspects and embodiments of the subject disclosure.

Turning now to FIG. 3, illustrated is an example block diagram 300 of the radio access network controller 206 in accordance with various aspects and embodiments of the subject disclosure. The radio access network controller 206 can comprise an optimization engine 302, which can incorporate or be coupled to a machine learning engine. The optimization engine 302 can facilitate operations of a mobility manager 304, a multiconnectivity manager 306 to manage carrier aggregation/dual connectivity addition/removal, and an IAB/topology/routing manager 308 to manage the topology of the IAB network and optimize routing updates.

With regard to the mobility manager 304, for Eutra NR Dual Connectivity (EN-DC) and standalone mobility procedures, NR has defined a procedure called Reconfiguration-With-Sync, which includes both primary cell (PCell) handovers for master cell group (MCG) and PSCell addition/change procedures for secondary cell group (SCG) connectivity. To determine when to perform this procedure, the network may configure the UE to derive reference signal received power (RSRP), reference signal received quality (RSRQ) and signal-to-interference-plus-noise ratio (SINR) measurement results per reference signal (RS) index (e.g., SSB or CSI-RS beam) or cell associated to NR measurement objects based on parameters configured in the RRC configured measurement object (e.g., maximum number of beams to be averaged and beam consolidation thresholds) and in the RRC configured report config (including the reference signal type to be measured, SS/PBCH block or channel state information-reference signals (CSI-RS)). Both periodic and event-triggered measurements can be configured.

In case of event-triggered measurement reports, the RRC signaling specifies criteria for triggering of an NR measurement reporting event. The criteria can include comparing the current serving cell to absolute thresholds, as well as comparing neighboring detected cells to serving cells with a relative offset or absolute threshold.

In addition, procedures such as conditional HO (handover) may be supported to enable the UE to initiate handover or secondary cell group change mobility procedures. In this case the network configures the UE with the thresholds for measurement reporting, as well as information corresponding to when the UE can autonomously trigger the handover or secondary cell group change.

The CU-RC interface (FIG. 2) may provide the following parameters to the centralized unit 202 for controlling the UE mobility measurements via RRC configuration: RS configuration (e.g., SMTC or SS/PBCH Block Measurement Time Configuration, set of CSI-RS RRM resources); Event Threshold; Hysteresis; Time-To-Trigger; Trigger Quantity (e.g., RSRP, RSRQ, SINR); and White Cell List (if used by the network), and possibly others.

In order to properly configure the measurement and reporting triggers and mobility procedure parameters, the algorithms and analytics processing in the RAN controller 206 log the measurement reports from UEs, and log the success/failure metrics associated with a given set of parameters/reported metrics. For example, certain timers configured by the network at the UE (e.g., T304) are also associated with Reconfiguration-With-Sync procedures. In addition, the RAN controller 206 may utilize data such as the number of successful random access attempts on a target cell to tune a set of thresholds and timers.

Based on the measurements and analytics from the centralized unit 202, the RAN controller 206 can optimize different metrics related to mobility/RRM procedures, such as increasing the success rate of (e.g., maximizing) the number of successful handover/secondary cell group change events, reducing or minimizing the number of failures, reducing the interruption time during the Reconfiguration-With-Sync procedure, and/or creating policies governing when to trigger a handover or secondary cell group change based on UE speed, location, device type, or QoS profile. Information about UE trajectory (speed, location, etc.) can be provided from the centralized unit 202 based on RAN measurements, or may be provided the RAN controller 206 by a location server/database which obtains the information from application layer data from the devices.

In addition to optimizing mobility procedures, the RAN controller 206 can additionally utilize measurements and radio link failure (RLF) statistics from the centralized unit 202 to optimize and configure timers/thresholds used for RLF procedures and radio link monitoring (RLM) resources and for both master cell group and secondary cell group connectivity legs.

The multiconnectivity manager 306 can facilitate optimization of single connectivity and dual connectivity. While activation/deactivation of secondary cells is a MAC-controlled procedure and may not be suitable for the CU-RC interface (unless there is an additional interface from the RAN controller 206 to the distributed unit), the additional/removal of secondary cells is controlled by RRC at the centralized unit 202 and can be based on multiple factors such as RRM measurements (e.g., coverage relative to the primary cell), UE capabilities, QoS, and bearer-level traffic statistics. In addition, the configuration of discontinuous reception (DRX) and measurement gaps can have a large influence of the ability of the distributed unit scheduler to take advantage of channel-aware feedback and bursty traffic arrivals. In this way, the RAN controller 206 can take these factors into account and provide the secondary cell configurations to the centralized unit 202 over the RC-CU interface.

For EN-DC or NR-NR DC, RRC, messages are exchanged between the master eNB or gNB to request the SgNB to perform certain actions, e.g., to establish, modify or release a secondary cell group. The message may include additional information, e.g., to assist the SgNB to set the secondary cell group configuration. The message can also be used by a centralized unit to request a distributed unit to perform certain actions, e.g., to establish, modify or release a main cell group or secondary cell group. In addition to RRM-related configurations, for dual connectivity, bearer configurations and power sharing parameters also can be configured, which can be according to policies at the RAN controller 206 related to capacity, coverage, or UE power optimization objectives. When to add/remove a secondary gNB can be controlled by the RAN controller 206 over the RC-CU, either explicitly by providing the RRC messages to the centralized unit 202, or implicitly by providing policies to the centralized unit 202 governing the establishment or modification of dual connectivity for a UE.

Figure 4:
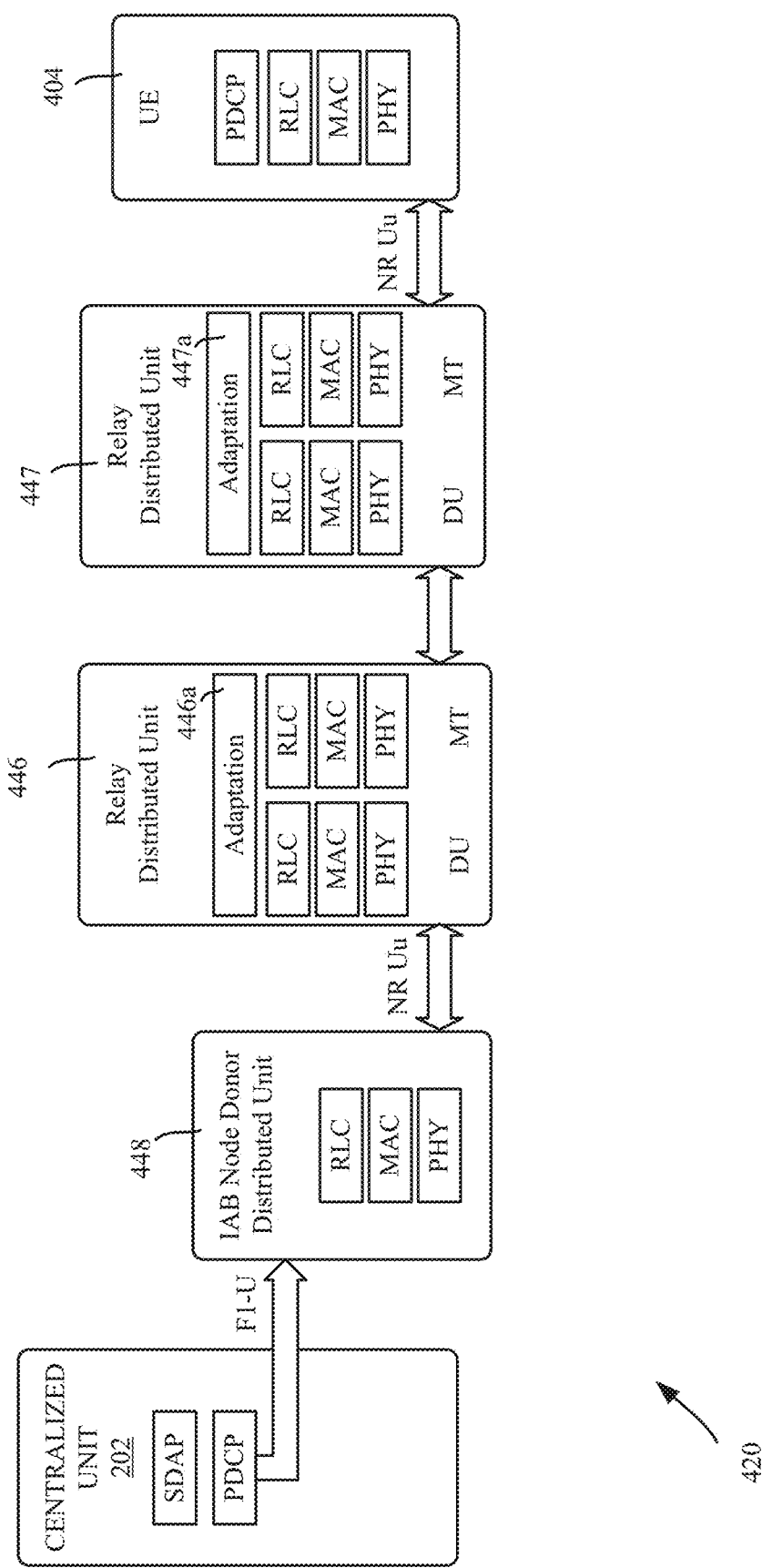
FIG. 4 illustrates an example block diagram representing integrated access and backhaul network topology and routing, in accordance with various aspects and embodiments of the subject disclosure.

The IAB manager 308 can optimize routing and IAB topology for a network. An L2 multi-hop IAB architecture can be built on the basic CU-DU split. However, instead of having a single distributed unit, as shown in FIG. 4 a combination of UE 404 and distributed units (e.g., 446 and 447) along with a donor distributed unit 448 can be cascaded to create a multi-hop network. Similar to a CU-DU split, various functions such as RRC and PDCP for the UEs, including the UE-Fs of the distributed unit reside in the centralized unit 202, which can be also referred to as the donor CU.

As shown in FIG. 4, in order to support the routing and forwarding of packets, a protocol stack layer, referred to as an "adaptation layer," can be added above the RLC layer at the IAB nodes. The adaptation layers (446a-447a) may perform the tasks of routing of UE traffic across the multi-hop network, and performing an aggregation of bearers from multiple UE into common backhaul bearers. More particularly, this adaptation layer can be responsible for forwarding and routing of traffic, as well as for multiplexing and de-multiplexing UE bearers with a single backhaul RLC channel (which can be referred to as an RLC channel instead of a bearer, because PDCP may not be used on the intermediate nodes when relaying traffic). This also implies that route switching due to load balancing, in response to link blockage/failure, or in response to UE mobility can be handled below L3 (network layer 3), because the RRC anchor does not change and the procedures/signaling to address it can be contained within the RAN. This can be an additional benefit of utilizing the CU-DU split architecture for IAB, because support for fast mobility and fast route update can include minimal RRC configuration changes.

The configuration of parameters for the IAB nodes to connect to each other via topology adaptation and initiate route changes/selection can be centrally managed at the donor CU or by the RAN controller 206. In one example the construction of the topology graph of the set of possible connections between IAB nodes and donors may be performed by the RAN controller 206, which can be a long-term decision that does not change, while the selection of one or more routes to utilize for routing a given packet may be performed by the IAB node or IAB donor.

Figure 5:
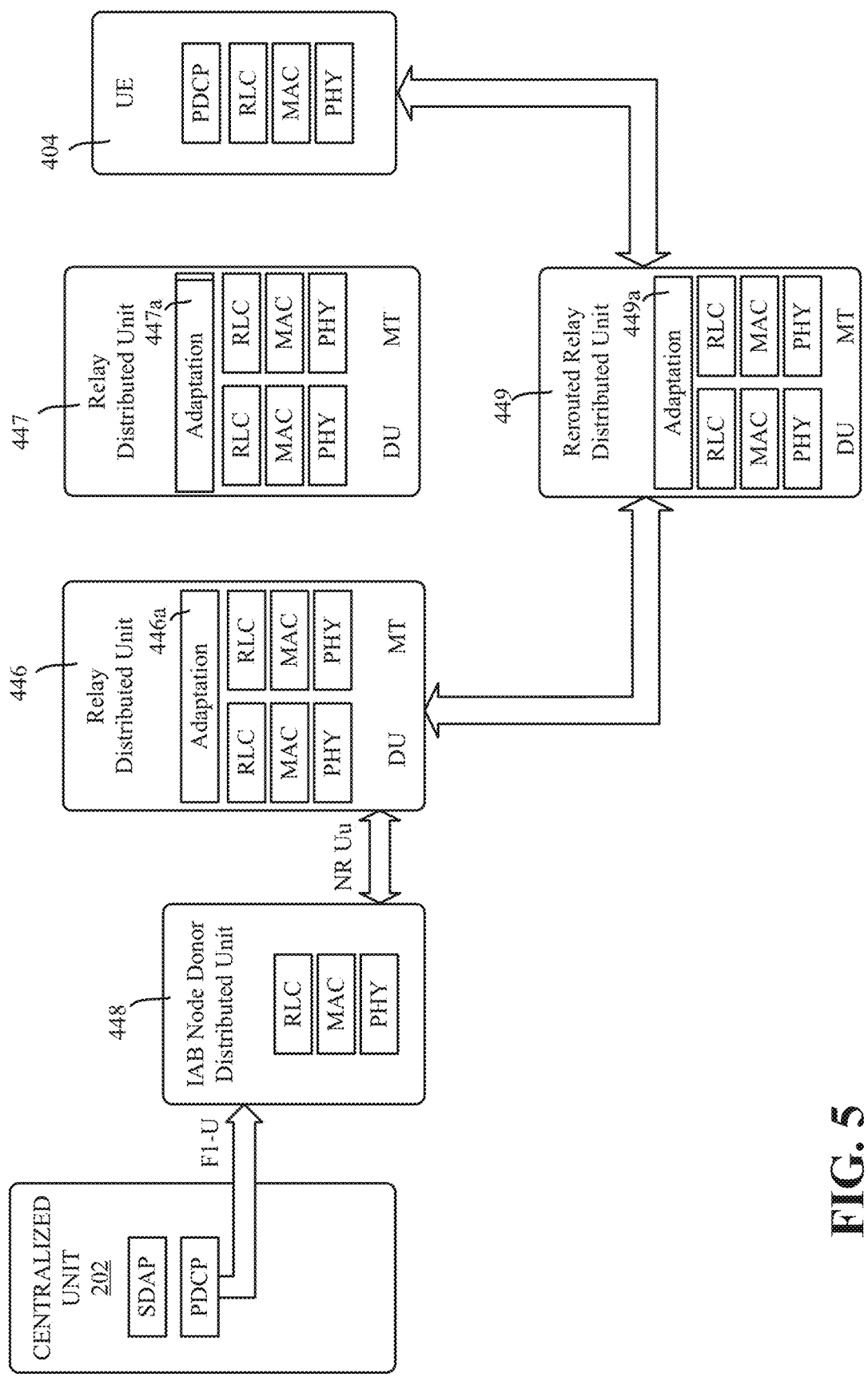
FIG. 5 illustrates an example block diagram representing integrated access and backhaul network topology and re-routing of traffic, in accordance with various aspects and embodiments of the subject disclosure.

By way of example, FIG. 5 shows how one route for routing a given packet is changed to another route by routing through a relay distributed unit 449 (with adaptation layer 449a) instead of through the relay distributed unit 447.

In one example, routing tables used at the adaptation layer to forward control plane and user plane traffic across one or more backhaul hops may be optimized based on RSRP/RSRQ RRM measurements made across IAB nodes, cross-link interference measurements, traffic load, end-to-end user or per-backhaul link throughput and latency, frame structure, access and backhaul multiplexing capabilities at the IAB node, and information about the IAB topology (e.g., number of connected child IAB nodes or access UEs). The measurements/metrics from the centralized unit 202 and topology and route selection parameters/policies from the RAN controller 206 may be exchanged over the CU-RC interface. The RAN controller 206 can additionally take into account information which may not be available in the RAN or donor CU such as user location, application layer metrics, non-NR/3GPP traffic sent over backhaul links, and IAB node power consumption.

In another example, the RAN controller 206 provides the IAB topology manager at the centralized unit 202 or donor node with policies and parameters to use when determining which IAB nodes to connect for backhaul routing. For example the policies may indicate latency bounds, throughput ranges, serving cell or interference measurement thresholds, reliability targets, or minimum/maximum number of supportable downstream child nodes and/or access UEs.

In another example, the RAN controller 206 may be able to directly obtain various radio measurements and scheduling/resource allocation metrics directly from the IAB nodes via an interface between the RAN controller 206 and IAB distributed units, which is tunneled over radio bearers managed at the donor CU. For example, if IP connectivity can be supported between the IAB node DUs and MTs (distributed unit function, and the mobile terminal function, which is the UE function within the relay node) and the RAN controller 206, the topology/routing optimization functionality at the RAN controller 206 can directly request update measurements/information from the IAB nodes via an application layer protocol instead of relying on RAN-defined signaling (e.g., RRC or F1 messages). This interface can also be used for remote operational management of the IAB nodes (e.g. IAB node hardware/software status and configuration of parameters which are not managed by the donor CU)

Figure 6:
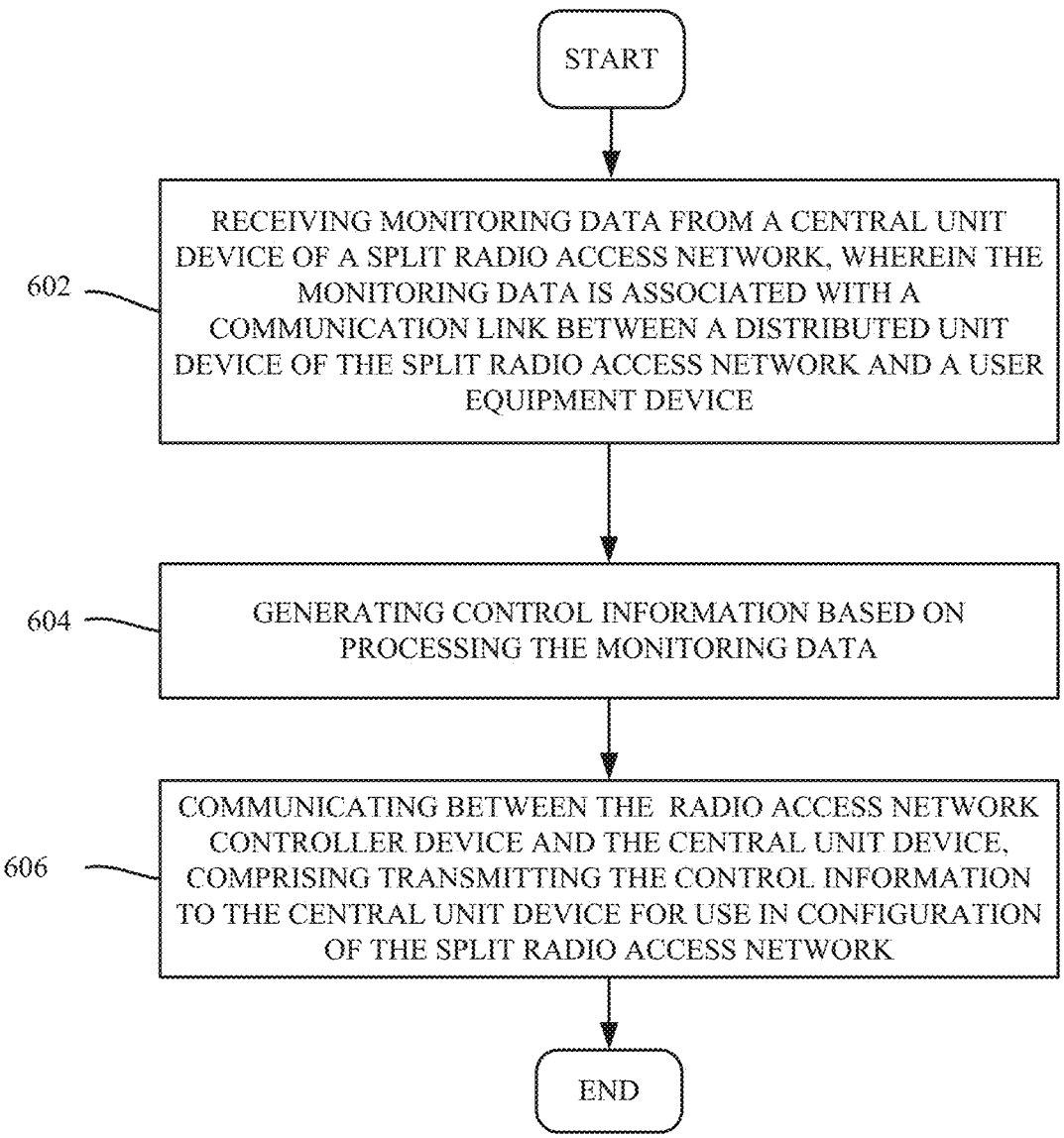
FIG. 6 illustrates example operations for generating control information in a radio access network controller for use in configuration of the radio access network, in accordance with various aspects and embodiments of the subject disclosure.

One or more example aspects are represented in FIG. 6, and can correspond to a radio access network controller device comprising a processor and a memory that stores executable instructions that, when executed by the processor, facilitate performance of operations and/or components. Example operations comprise operation 602, which represents receiving monitoring data from a central unit device of a split radio access network, wherein the monitoring data is associated with a communication link between a distributed unit device of the split radio access network and a user equipment device. Operation 604 represents generating control information based on processing the monitoring data. Operation 606 represents communicating between the radio access network controller device and the central unit device, comprising transmitting the control information to the central unit device for use in configuration of the radio access network.

Generating the control information based on the processing the monitoring data can comprise determining policy data for transmitting as the control information to the central unit device. Generating the control information can comprise generating a radio resource control information element, and the transmitting the control information to the central unit device can comprise transmitting a message comprising the radio resource control information element.

Generating the control information based on the processing the monitoring data can comprise generating optimization data configured to optimize the communication link based on an analysis of the monitoring data.

Generating the control information based on the processing the monitoring data can comprise generating at least one of: first optimization data to increase a success rate of handover events, or second optimization data to increase a success rate of secondary cell group change events. Generating the control information based on the processing the monitoring data can comprise determining an addition or a removal of a secondary cell associated with the user equipment device. Generating the control information based on the processing the monitoring data can comprise determining a topology for integrated access and backhaul nodes.

The distributed unit can comprise an integrated access and backhaul node, and wherein the generating the control information based on the processing the monitoring data can comprise selecting a route for traffic between the user equipment and the integrated access and backhaul node.

Figure 7:
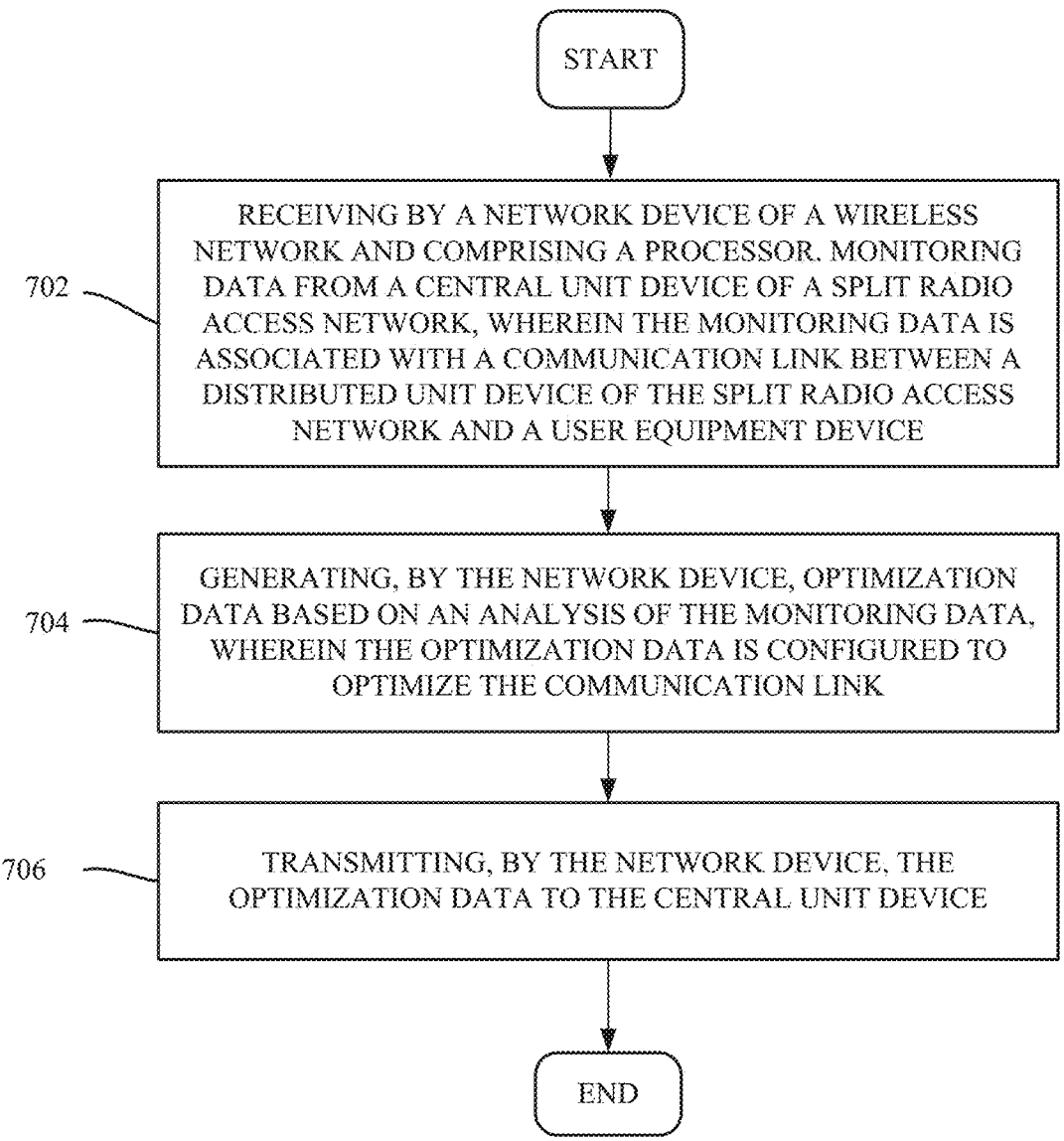
FIG. 7 illustrates example operations for optimizing a wireless network based on received monitoring data, in accordance with various aspects and embodiments of the subject disclosure.

One or more aspects, such as those implemented in example operations of a method, are shown in FIG. 7 in accordance with various aspects and embodiments of the subject disclosure. Operation 702 represents receiving, by a network device of a wireless network and comprising a processor, monitoring data from a central unit device of a split radio access network, wherein the monitoring data is associated with a communication link between a distributed unit device of the split radio access network and a user equipment device. Operation 704 represents generating, by the network device, optimization data based on an analysis of the monitoring data, wherein the optimization data is configured to optimize the communication link. Operation 706 represents transmitting, by the network device, the optimization data to the central unit device.

Receiving the monitoring data can comprise receiving at least one of: measurement data, metric data, counter data, statistics data, or message data. Receiving the monitoring data can comprise receiving the monitoring data as pre-processed data by the central unit device.

Generating the optimization data can comprise generating radio resource control data for use in configuring the distributed unit device. Generating the optimization data can comprise generating policy data for use by the central unit device in configuration of the communication link. Generating the optimization data can comprise generating at least one of: radio resource management data, machine learning data or routing data.

Generating the optimization data can comprise generating at least one of: first optimization data to increase a success rate of handover events, or second optimization data to increase a success rate of secondary cell group change events. Generating the optimization data can comprise determining an addition or a removal of a secondary cell associated with the user equipment device. Generating the optimization data can comprise determining a topology for integrated access and backhaul nodes.

Figure 8:
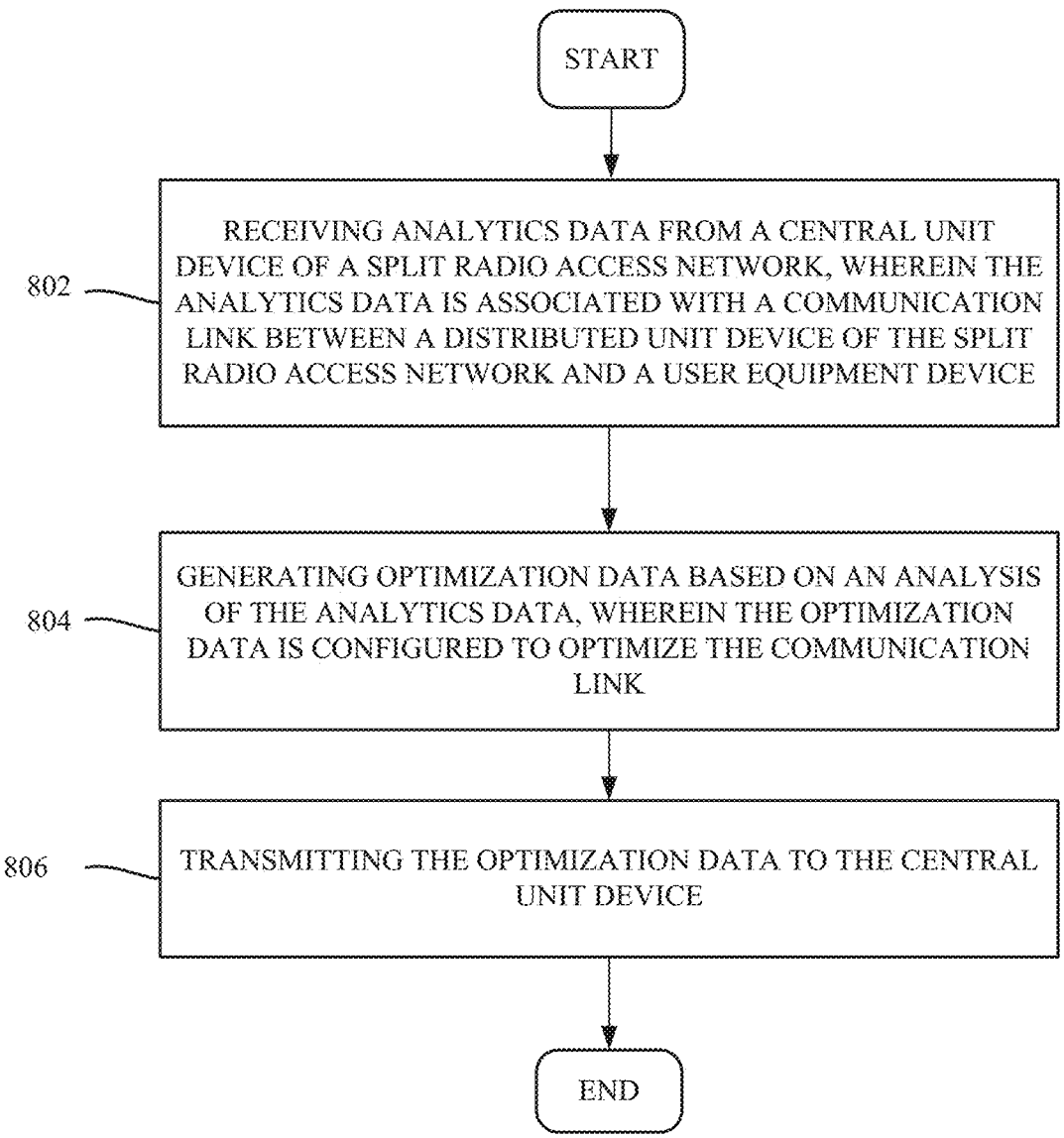
FIG. 8 illustrates example operations for optimizing a wireless network based on received analytics data, in accordance with various aspects and embodiments of the subject disclosure.

One or more aspects, such as implemented in a machine-readable storage medium, comprising executable instructions that, when executed by a processor, facilitate performance of operations, are represented in FIG. 8. Example operations comprise operation 802, which represents receiving analytics data from a central unit device of a split radio access network, wherein the analytics data is associated with a communication link between a distributed unit device of the split radio access network and a user equipment device. Operation 804 represents generating optimization data based on an analysis of the monitoring data, wherein the optimization data is configured to optimize the communication link. Operation 806 represents transmitting the optimization data to the central unit device.

Generating the optimization data can comprise generating at least one of: dual connectivity control information associated with the user equipment, or mobility procedure control information associated with the user equipment. The distributed unit can comprise an integrated access and backhaul node, and the generating the optimization data can comprise selecting a route for traffic between the user equipment and the integrated access and backhaul node.

Figure 9:
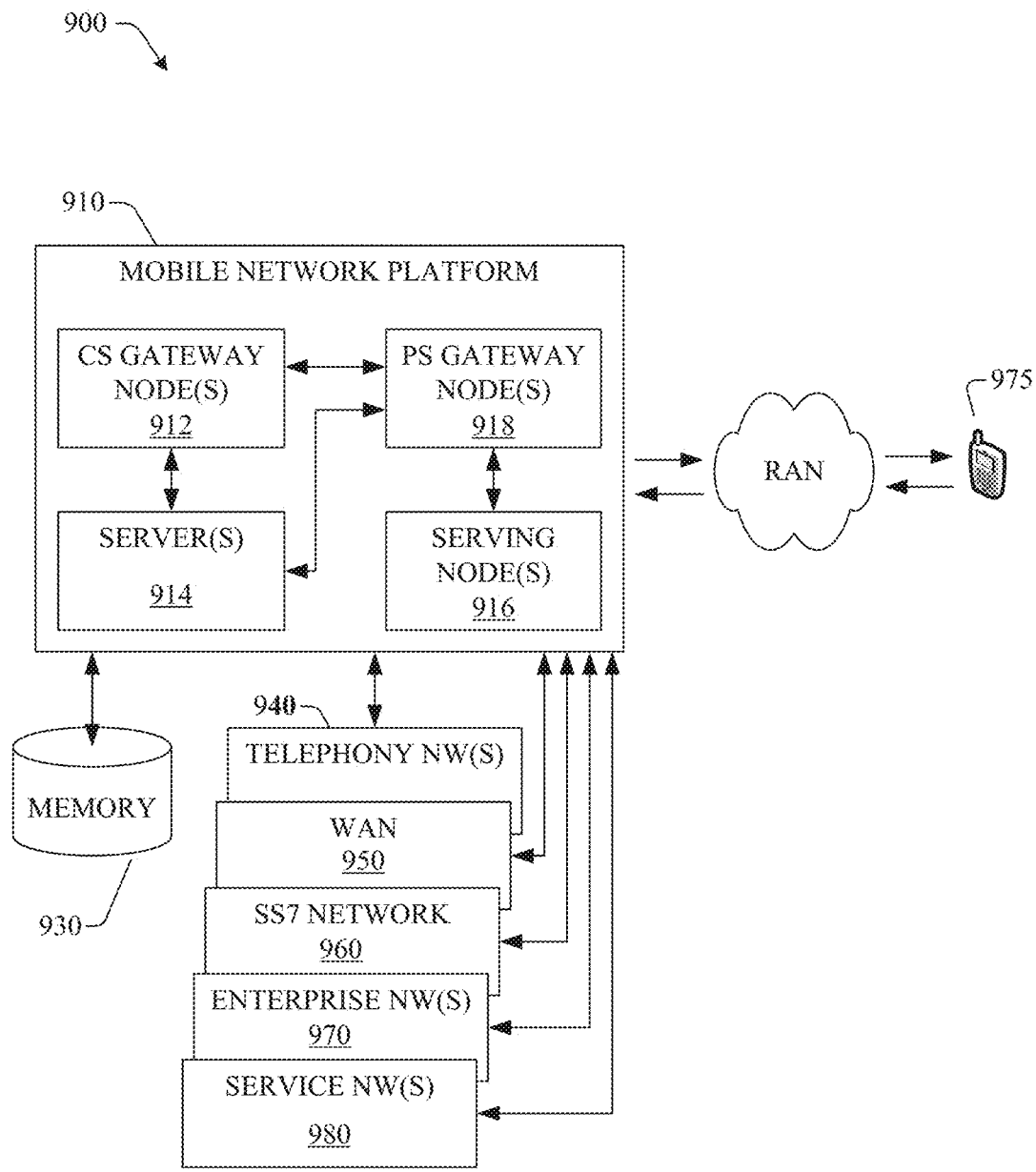
FIG. 9 illustrates an example block diagram of a non-limiting embodiment of a mobile network platform, in accordance with various aspects described herein.

As can be seen, the technology described herein facilitates optimization and configuration of mobility procedures including handovers and/or secondary cell group changes for both standalone and non-standalone operation of NR networks. The technology described herein facilitates optimization of carrier aggregation and dual connectivity procedures and configurations based on multiple metrics including capacity, coverage, and UE power consumption. The technology described herein facilitates centralized optimization of topology and route selection for IAB nodes which can operate using RAN-centric or IP-based signaling FIG. 9 presents an example embodiment 900 of a mobile network platform 910 that can implement and exploit one or more aspects of the disclosed subject matter described herein. Generally, wireless network platform 910 can include components, e.g., nodes, gateways, interfaces, servers, or disparate platforms, that facilitate both packet-switched (PS) (e.g., internet protocol (IP), frame relay, asynchronous transfer mode (ATM) and circuit-switched (CS) traffic (e.g., voice and data), as well as control generation for networked wireless telecommunication. As a non-limiting example, wireless network platform 910 can be included in telecommunications carrier networks, and can be considered carrier-side components as discussed elsewhere herein. Mobile network platform 910 includes CS gateway node(s) 912 which can interface CS traffic received from legacy networks like telephony network(s) 940 (e.g., public switched telephone network (PSTN), or public land mobile network (PLMN)) or a signaling system #7 (SS7) network 960. Circuit switched gateway node(s) 912 can authorize and authenticate traffic (e.g., voice) arising from such networks. Additionally, CS gateway node(s) 912 can access mobility, or roaming, data generated through SS7 network 960; for instance, mobility data stored in a visited location register (VLR), which can reside in memory 930. Moreover, CS gateway node(s) 912 interfaces CS-based traffic and signaling and PS gateway node(s) 918. As an example, in a 3GPP UMTS network, CS gateway node(s) 912 can be realized at least in part in gateway GPRS support node(s) (GGSN). It should be appreciated that functionality and specific operation of CS gateway node(s) 912, PS gateway node(s) 918, and serving node(s) 916, is provided and dictated by radio technology(ies) utilized by mobile network platform 910 for telecommunication. Mobile network platform 910 can also include the MMEs, HSS/PCRFs, SGWs, and PGWs disclosed herein.

In addition to receiving and processing CS-switched traffic and signaling, PS gateway node(s) 918 can authorize and authenticate PS-based data sessions with served mobile devices. Data sessions can include traffic, or content(s), exchanged with networks external to the wireless network platform 910, like wide area network(s) (WANs) 950, enterprise network(s) 970, and service network(s) 980, which can be embodied in local area network(s) (LANs), can also be interfaced with mobile network platform 910 through PS gateway node(s) 918. It is to be noted that WANs 950 and enterprise network(s) 970 can embody, at least in part, a service network(s) like IP multimedia subsystem (IMS). Based on radio technology layer(s) available in technology resource(s) 917, packet-switched gateway node(s) 918 can generate packet data protocol contexts when a data session is established; other data structures that facilitate routing of packetized data also can be generated. To that end, in an aspect, PS gateway node(s) 918 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 900, wireless network platform 910 also includes serving node(s) 916 that, based upon available radio technology layer(s) within technology resource(s) 917, convey the various packetized flows of data streams received through PS gateway node(s) 918. It is to be noted that for technology resource(s) 917 that rely primarily on CS communication, server node(s) can deliver traffic without reliance on PS gateway node(s) 918; for example, server node(s) can embody at least in part a mobile switching center. As an example, in a 3GPP UMTS network, serving node(s) 916 can be embodied in serving GPRS support node(s) (SGSN).

For radio technologies that exploit packetized communication, server(s) 914 in wireless network platform 910 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 910. Data streams (e.g., content(s) that are part of a voice call or data session) can be conveyed to PS gateway node(s) 918 for authorization/authentication and initiation of a data session, and to serving node(s) 916 for communication thereafter. In addition to application server, server(s) 914 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 910 to ensure network's operation and data integrity in addition to authorization and authentication procedures that CS gateway node(s) 912 and PS gateway node(s) 918 can enact. Moreover, provisioning server(s) can provision services from external network(s) like networks operated by a disparate service provider; for instance, WAN 950 or Global Positioning System (GPS) network(s) (not shown). Provisioning server(s) can also provision coverage through networks associated to wireless network platform 910 (e.g., deployed and operated by the same service provider), such as femto-cell network(s) (not shown) that enhance wireless service coverage within indoor confined spaces and offload RAN resources in order to enhance subscriber service experience within a home or business environment by way of UE 975.

It is to be noted that server(s) 914 can include one or more processors configured to confer at least in part the functionality of macro network platform 910. To that end, the one or more processor can execute code instructions stored in memory 930, for example. It is should be appreciated that server(s) 914 can include a content manager 915, which operates in substantially the same manner as described hereinbefore.

In example embodiment 900, memory 930 can store information related to operation of wireless network platform 910. Other operational information can include provisioning information of mobile devices served through wireless platform network 910, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 930 can also store information from at least one of telephony network(s) 940, WAN 950, enterprise network(s) 970, or SS7 network 960. In an aspect, memory 930 can be, for example, accessed as part of a data store component or as a remotely connected memory store.

Figure 10:
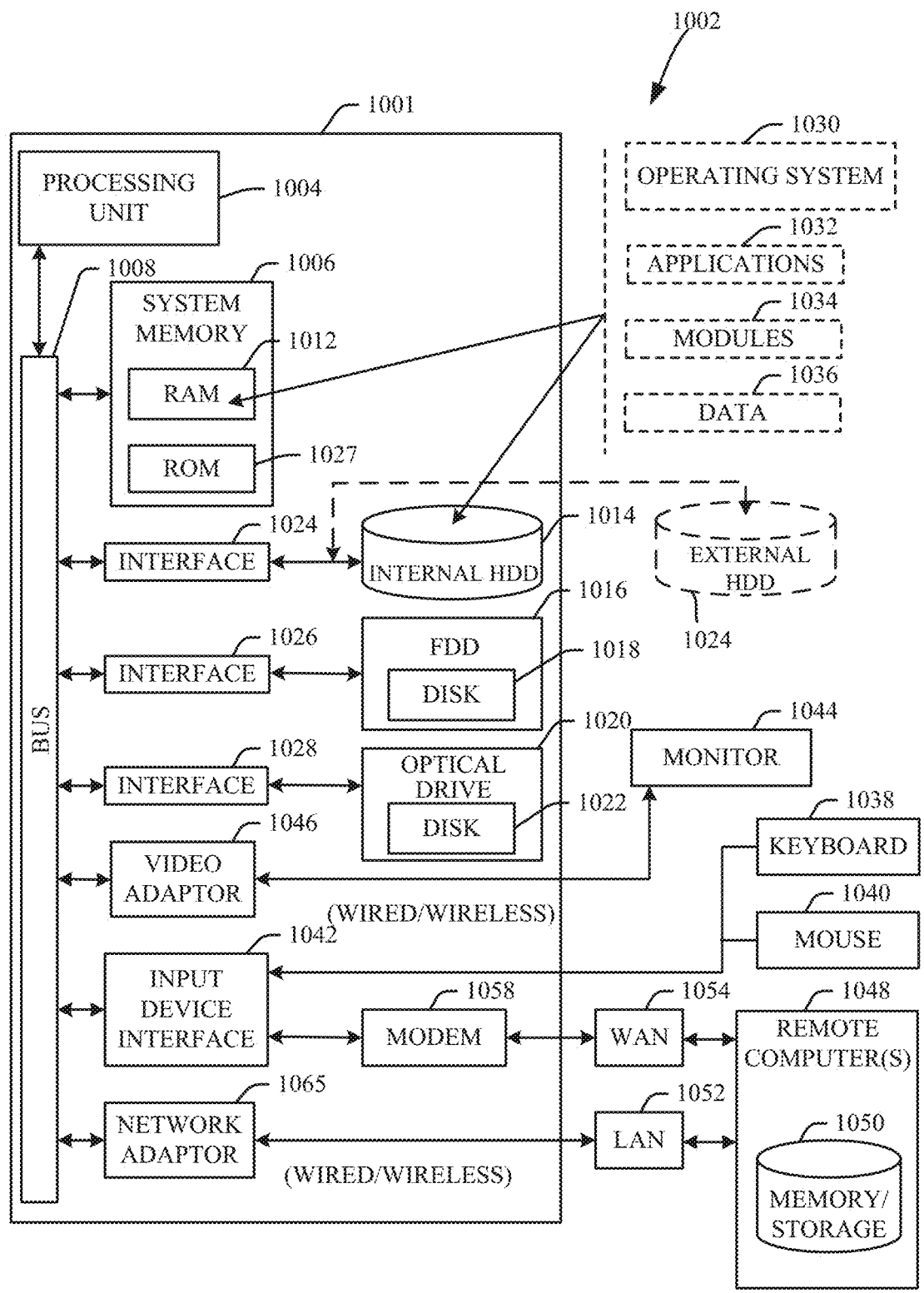
FIG. 10 illustrates an example block diagram of a computer that can be operable to execute processes and methods, in accordance with various aspects and embodiments of the subject disclosure.

Referring now to FIG. 10, there is illustrated a block diagram of a computer 1000 operable to execute the functions and operations performed in the described example embodiments. The computer 1000 can provide networking and communication capabilities between a wired or wireless communication network and a server and/or communication device. In order to provide additional context for various aspects thereof, the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

Referring now to FIG. 10, there is illustrated a block diagram of a computer 1000 operable to execute the functions and operations performed in the described example embodiments. For example, a network node (e.g., network node 106) may contain components as described in FIG. 10. The computer 1000 can provide networking and communication capabilities between a wired or wireless communication network and a server and/or communication device. In order to provide additional context for various aspects thereof, FIG. 10 and the following discussion are intended to provide a brief, general description of a suitable computing environment in which the various aspects of the embodiments can be implemented to facilitate the establishment of a transaction between an entity and a third party. While the description above is in the general context of computer-executable instructions that can run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the various embodiments can also be practiced in distributed computing environments where certain tasks are performed by remote processing devices that are linked through a communications network.

In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 10, implementing various aspects described herein with regards to the end-user device can include a computer 1000, the computer 1000 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes read-only memory (ROM) 1027 and random access memory (RAM) 1012. A basic input/output system (BIOS) is stored in a non-volatile memory 1027 such as ROM, EPROM, EEPROM, which BIOS contains the basic routines that help to transfer information between elements within the computer 1000, such as during start-up. The RAM 1012 can also include a high-speed RAM such as static RAM for caching data.

The computer 1000 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the subject embodiments.

The drives and their associated computer-readable media provide nonvolatile storage of data, data structures, computer-executable instructions, and so forth. For the computer 1000 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1000, such as zip drives, magnetic cassettes, flash memory cards, cartridges, and the like, can also be used in the example operating environment, and further, that any such media can contain computer-executable instructions for performing the methods of the disclosed embodiments.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is to be appreciated that the various embodiments can be implemented with various commercially available operating systems or combinations of operating systems.

A user can enter commands and information into the computer 1000 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer 1000 typically includes other peripheral output devices (not shown), such as speakers, printers, etc.

The computer 1000 can operate in a networked environment using logical connections by wired and/or wireless communications to one or more remote computers, such as a remote computer(s) 1048. The remote computer(s) 1048 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1000 is connected to the local network 1052 through a wired and/or wireless communication network interface or adapter 1056. The adapter 1056 may facilitate wired or wireless communication to the LAN 1052, which may also include a wireless access point disposed thereon for communicating with the wireless adapter 1056.

When used in a WAN networking environment, the computer 1000 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the input device interface 1042. In a networked environment, program modules depicted relative to the computer, or portions thereof, can be stored in the remote memory/storage device 1050. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE802.11 (a, b, g, n, etc.) to provide secure, reliable, fast wireless connectivity. A Wi-Fi network can be used to connect computers to each other, to the Internet, and to wired networks (which use IEEE802.3 or Ethernet). Wi-Fi networks operate in the unlicensed 2.4 and 9 GHz radio bands, at an 11 Mbps (802.11b) or 94 Mbps (802.11a) data rate, for example, or with products that contain both bands (dual band), so the networks can provide real-world performance similar to the basic "10BaseT" wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor also can be implemented as a combination of computing processing units.

In the subject specification, terms such as "store," "data store," "data storage," "database," "repository," "queue", and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory. In addition, memory components or memory elements can be removable or stationary. Moreover, memory can be internal or external to a device or component, or removable or stationary. Memory can comprise various types of media that are readable by a computer, such as hard-disc drives, zip drives, magnetic cassettes, flash memory cards or other types of memory cards, cartridges, or the like.

By way of illustration, and not limitation, nonvolatile memory can comprise read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated example aspects of the embodiments. In this regard, it will also be recognized that the embodiments comprise a system as well as a computer-readable medium having computer-executable instructions for performing the acts and/or events of the various methods.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information.

In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium.

On the other hand, communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communications media comprise wired media, such as a wired network or direct-wired connection, and wireless media such as acoustic, RF, infrared and other wireless media Further, terms like "user equipment," "user device," "mobile device," "mobile," station," "access terminal," "terminal," "handset," and similar terminology, generally refer to a wireless device utilized by a subscriber or user of a wireless communication network or service to receive or convey data, control, voice, video, sound, gaming, or substantially any data-stream or signaling-stream. The foregoing terms are utilized interchangeably in the subject specification and related drawings. Likewise, the terms "access point," "node B," "base station," "evolved Node B," "cell," "cell site," and the like, can be utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows. It is noted that in the subject specification and drawings, context or explicit distinction provides differentiation with respect to access points or base stations that serve and receive data from a mobile device in an outdoor environment, and access points or base stations that operate in a confined, primarily indoor environment overlaid in an outdoor coverage area. Data and signaling streams can be packetized or frame-based flows.

Furthermore, the terms "user," "subscriber," "customer," "consumer," and the like are employed interchangeably throughout the subject specification, unless context warrants particular distinction(s) among the terms. It should be appreciated that such terms can refer to human entities, associated devices, or automated components supported through artificial intelligence (e.g., a capacity to make inference based on complex mathematical formalisms) which can provide simulated vision, sound recognition and so forth. In addition, the terms "wireless network" and "network" are used interchangeable in the subject application, when context wherein the term is utilized warrants distinction for clarity purposes such distinction is made explicit.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

In addition, while a particular feature may have been disclosed with respect to only one of several implementations, such feature may be combined with one or more other features of the other implementations as may be desired and advantageous for any given or particular application. Furthermore, to the extent that the terms "includes" and "including" and variants thereof are used in either the detailed description or the claims, these terms are intended to be inclusive in a manner similar to the term "comprising."

The above descriptions of various embodiments of the subject disclosure and corresponding figures and what is described in the Abstract, are described herein for illustrative purposes, and are not intended to be exhaustive or to limit the disclosed embodiments to the precise forms disclosed. It is to be understood that one of ordinary skill in the art may recognize that other embodiments having modifications, permutations, combinations, and additions can be implemented for performing the same, similar, alternative, or substitute functions of the disclosed subject matter, and are therefore considered within the scope of this disclosure. Therefore, the disclosed subject matter should not be limited to any single embodiment described herein, but rather should be construed in breadth and scope in accordance with the claims below.

What is claimed is:

1. A radio access network controller, comprising:
a processor; and
a memory that stores executable instructions that, when executed by the processor, facilitate performance of operations, comprising:
receiving monitoring data from a central unit via a split radio access network, wherein the monitoring data is associated with a communication link between a distributed unit associated with the split radio access network and a user equipment;
generating control information based on processing the monitoring data, wherein the generating of the control information comprises selecting a route for traffic between the user equipment and the distributed unit based on respective power consumption of integrated access and backhaul nodes associated with the split radio access network; and
communicating between the radio access network controller and the central unit, comprising transmitting the control information to the central unit for use in configuration of network equipment associated with the split radio access network.

2. The radio access network controller of claim 1, wherein the generating of the control information based on the processing of the monitoring data further comprises determining policy data for the transmitting of the control information to the central unit.

3. The radio access network controller of claim 1, wherein the generating of the control information further comprises generating a radio resource control information element, and wherein the transmitting of the control information to the central unit comprises transmitting a message comprising the radio resource control information element.

4. The radio access network controller of claim 1, wherein the generating of the control information based on the processing of the monitoring data further comprises generating optimization data configured to optimize the communication link based on an analysis of the monitoring data.

5. The radio access network controller of claim 1, wherein the generating of the control information based on the processing of the monitoring data further comprises generating at least one of: first optimization data to increase a success rate of handover events, or second optimization data to increase a success rate of secondary cell group change events.

6. The radio access network controller of claim 1, wherein the generating of the control information based on the processing of the monitoring data further comprises determining an addition or a removal of a secondary cell associated with the user equipment.

7. The radio access network controller of claim 1, wherein the generating of the control information based on the processing of the monitoring data further comprises determining a topology for the integrated access and backhaul nodes.

8. The radio access network controller of claim 1, wherein the generating of the control information based on the processing of the monitoring data further comprises selecting the route for traffic between the user equipment and the distributed unit further based on third generation partnership project traffic on links enabled via the split radio access network.

9. A method, comprising:
receiving, by network equipment comprising a processor, monitoring data from a central unit device via a split radio access network, wherein the monitoring data is associated with a communication link between a distributed unit device included in the split radio access network and a user equipment;
generating, by the network equipment, optimization data based on an analysis of the monitoring data, wherein the optimization data is configured to optimize the communication link, and the optimization data comprises a route selected for traffic between the user equipment and the distributed unit device based on respective power consumption of integrated access and backhaul nodes included in the split radio access network; and
transmitting, by the network equipment, the optimization data to the central unit device.

10. The method of claim 9, wherein the receiving of the monitoring data comprises receiving at least one of: measurement data, metric data, counter data, statistics data, or message data.

11. The method of claim 9, wherein the generating of the optimization data comprises generating radio resource control data for use in configuring the distributed unit device.

12. The method of claim 9, wherein the generating of the optimization data comprises generating policy data for use by the central unit device in configuration of the communication link.

13. The method of claim 9, wherein the generating of the optimization data comprises generating at least one of: radio resource management data, machine learning data or routing data.

14. The method of claim 9, wherein the receiving of the monitoring data comprises receiving the monitoring data as pre-processed data by the central unit device.

15. The method of claim 9, wherein the generating of the optimization data comprises generating at least one of: first optimization data to increase a success rate of handover events, or second optimization data to increase a success rate of secondary cell group change events.

16. The method of claim 9, wherein the generating of the optimization data comprises determining an addition or a removal of a secondary cell associated with the user equipment.

17. The method of claim 9, wherein the generating of the optimization data comprises determining a topology for the integrated access and backhaul nodes.

18. A non-transitory machine-readable medium, comprising executable instructions that, when executed by a processor, facilitate performance of operations, the operations comprising:
receiving analytics data from a central unit device via a split radio access network, wherein the analytics data is associated with a communication link between a distributed unit of the split radio access network and a user equipment;
generating optimization data based on an analysis of the analytics data, wherein the optimization data is configured to optimize the communication link, and the optimization data comprises a route selected for traffic between the user equipment and the distributed unit device based on respective power consumption of integrated access and backhaul nodes of the split radio access network; and
transmitting the optimization data to the central unit device.

19. The non-transitory machine-readable medium of claim 18, wherein the generating of the optimization data comprises generating at least one of: dual connectivity control information associated with the user equipment, or mobility procedure control information associated with the user equipment.

20. The non-transitory machine-readable medium of claim 18, wherein the generating of the optimization data comprises selecting the route for traffic between the user equipment and the distributed unit device further based on third generation partnership project traffic on links of the split radio access network.

* * * * *